(12) United States Patent
Kurasawa et al.

(10) Patent No.: US 11,620,997 B2
(45) Date of Patent: Apr. 4, 2023

(54) INFORMATION PROCESSING DEVICE AND INFORMATION PROCESSING METHOD

(71) Applicant: SONY CORPORATION, Tokyo (JP)

(72) Inventors: Hiromi Kurasawa, Tokyo (JP); Kazumi Aoyama, Saitama (JP); Yasuharu Asano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 250 days.

(21) Appl. No.: 16/982,201

(22) PCT Filed: Jan. 23, 2019

(86) PCT No.: PCT/JP2019/001991
§ 371 (c)(1),
(2) Date: Sep. 18, 2020

(87) PCT Pub. No.: WO2019/187549
PCT Pub. Date: Oct. 3, 2019

(65) Prior Publication Data
US 2021/0027779 A1    Jan. 28, 2021

(30) Foreign Application Priority Data

Mar. 27, 2018   (JP) .............................. JP2018-059203

(51) Int. Cl.
| | | |
|---|---|---|
| G10L 15/22 | (2006.01) | |
| G10L 15/07 | (2013.01) | |
| G10L 15/08 | (2006.01) | |

(52) U.S. Cl.
CPC .............. G10L 15/22 (2013.01); G10L 15/07 (2013.01); G10L 15/083 (2013.01);
(Continued)

(58) Field of Classification Search
CPC ......... G10L 15/22; G10L 15/00; G10L 15/01; G10L 15/065; G10L 15/07; G10L 15/075;
(Continued)

(56) References Cited

U.S. PATENT DOCUMENTS

| | | | |
|---|---|---|---|
| 9,860,282 B2 * | 1/2018 | Farrell | H04N 7/141 |
| 2005/0043956 A1 * | 2/2005 | Aoyama | G10L 15/22 |
| | | | 704/E15.04 |
| 2013/0182914 A1 * | 7/2013 | Sakai | H04N 7/15 |
| | | | 382/115 |

FOREIGN PATENT DOCUMENTS

| | | |
|---|---|---|
| JP | 2004-062063 A | 2/2004 |
| JP | 2008-187677 A | 8/2008 |

(Continued)

OTHER PUBLICATIONS

International Search Report and Written Opinion of PCT Application No. PCT/JP2019/001991, dated Apr. 23, 2019, 07 pages of ISRWO.

*Primary Examiner* — Qi Han
(74) *Attorney, Agent, or Firm* — Chip Law Group

(57) ABSTRACT

Provided is an information processing device that includes a determination unit that determines whether an object that outputs voice is a dialogue target related to voice dialogue based on a result of recognition of an input image, and a dialogue function unit that performs control related to the voice dialogue based on the determination. The dialogue function unit provides a voice dialogue function to the object based on the determination that the object being the dialogue target. Further provided is a method that includes determining whether an object that outputs voice is a dialogue target related to voice dialogue based on a result of recognition of an input image, and performing control related to the voice dialogue based on a result of the determining. The performing of the control further includes providing a voice dialogue (Continued)

function to the object based on the determination that the object is the dialogue target.

18 Claims, 12 Drawing Sheets

(52) U.S. Cl.
CPC .. *G10L 2015/088* (2013.01); *G10L 2015/223* (2013.01); *G10L 2015/228* (2013.01)

(58) Field of Classification Search
CPC ..... G10L 15/08; G10L 15/1815; G10L 15/24; G10L 15/26; G10L 2015/0631–0638; G10L 2015/221–228; G10L 17/22; G10L 17/00; G10L 17/02; G10L 17/06; G10L 17/10; G10L 17/14; G10L 17/26
USPC .... 704/275, 270.1, 270, 276, 235, 246, 250, 704/255, 257
See application file for complete search history.

(56) References Cited

FOREIGN PATENT DOCUMENTS

| JP | 2012-118634 A | 6/2012 |
| JP | 2017-054065 A | 3/2017 |

\* cited by examiner

| OBJECT RECOGNITION LABEL | VOICE OUTPUT CAPABILITY | DIALOGUE TARGET CORRESPONDENCE |
|---|---|---|
| TELEVISION | 1 | 0 |
| TABLET | 1 | 0 |
| SMARTPHONE | 1 | 0 |
| SPEAKER | 1 | 0 |
| AIR PURIFIER | 1 | 0 |
| PROJECTOR PROJECTION SCREEN | 0 | 0 |
| TELEPHONE | 1 | 0 |
| FIRE ALARM | 1 | 0 |
| TABLE | 0 | 0 |
| CHAIR | 0 | 0 |
| PERSON | 1 | 1 |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/001991 filed on Jan. 23, 2019, which claims priority benefit of Japanese Patent Application No. JP 2018-059203 filed in the Japan Patent Office on Mar. 27, 2018. Each of the above-referenced applications is hereby incorporated herein by reference in its entirety.

FIELD

The present disclosure relates to an information processing device and an information processing method.

BACKGROUND

Recently, devices configured to detect the presence of a person and perform various kinds of operations based on a result of the detection have become widely available. In addition, technologies for improving the accuracy of person detection as a trigger for an operation in a device as described above have been developed. For example, Patent Literature 1 discloses a technology of determining whether a person is a real live person by using temporal change of feature points of a face. According to the technology, for example, it is possible to prevent a subject such as a poster from being falsely detected as a real live person.

CITATION LIST

Patent Literature

Patent Literature 1: Japanese Patent Application Laid-open No. 2008-187677

SUMMARY

Technical Problem

However, with the technology described in Patent Literature 1, it is difficult to determine whether, for example, a person in a moving image displayed on a television device or the like is a real live person.

Thus, the present disclosure provides an information processing device and an information processing method that can more highly accurately detect an operation target.

Solution to Problem

According to the present disclosure, an information processing device is provided that includes: a determination unit configured to determine whether an object that outputs voice is a dialogue target related to voice dialogue based on a result of recognition of an input image; and a dialogue function unit configured to perform control related to the voice dialogue based on determination by the determination unit, wherein the dialogue function unit provides a voice dialogue function to the object based on a fact that it is determined by the determination unit that the object is the dialogue target.

Moreover, according to the present disclosure, an information processing method executed by a processor is provided that includes: determining whether an object that outputs voice is a dialogue target related to voice dialogue based on a result of recognition of an input image; and performing control related to the voice dialogue based on a result of the determining, the performing of the control further includes providing a voice dialogue function to the object based on a fact that it is determined that the object is the dialogue target.

Advantageous Effects of Invention

According to the present disclosure as described above, it is possible to more highly accurately detect an operation target.

The above-described effect is not necessarily restrictive but may include, in addition to or in place of the above-described effect, any effect described in the present specification or another effect that could be understood from the present specification.

DESCRIPTION OF EMBODIMENTS

Preferable embodiments of the present disclosure will be described below in detail with reference to the accompanying drawings. Note that, in the present specification and drawings, components having functional configurations identical to each other in effect are denoted by an identical reference sign, and duplication description thereof are omitted.

Note that the description is performed in an order below.
1. Background
2. First Embodiment
2.1. Exemplary Functional Configuration
2.2. Details of Function of Determination Unit 190
2.3. Details of Function of Dialogue Function Unit 150
3. Second Embodiment
3.1. Overview
3.2. Exemplary Functional Configuration
3.3. Details of Function of Moving Body Region Determination Unit 180
3.4. Details of Function of Dialogue Target Region Determination Unit 140
4. Exemplary Hardware Configuration
5. Conclusion 1. Background As described above, recently, devices configured to detect the presence of a person and perform various kinds of operations based on a result of the detection have become widely available. Examples of the above-described devices include an agent device configured to perform dialogue with a detected person by voice. For example, the agent device can receive a voice input by the detected person, execute response processing based on the voice input, and provide active information notification to the detected person.

Meanwhile, recently, agent devices as described above have become widely available to general households, and simultaneously, home electronic instruments configured to perform information notification using voice have become increasingly available. Examples of the above-described home electronic instruments include a refrigerator, a microwave, and a water heater. In addition, a large number of sound output devices such as a television device and a radio have been conventionally installed in a large number of houses.

Figure 11:
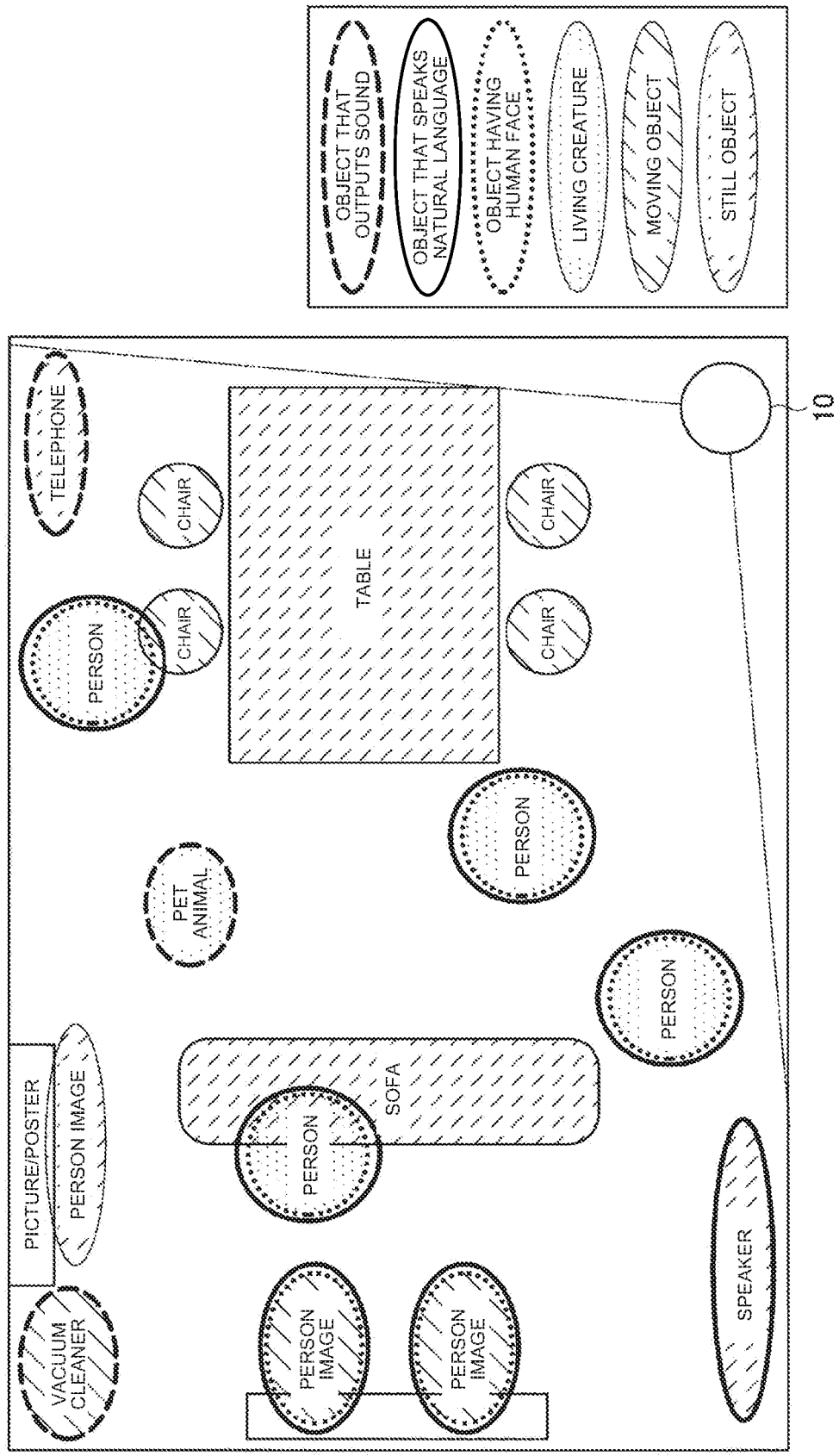
FIG. 11 is a diagram illustrating exemplary devices that output sound in a house.

FIG. 11 is a diagram illustrating exemplary devices that output sound in a house. In FIG. 11, instruments disposed in the house, persons and pet animals present in the house, and the like are classified in viewpoint of sound output and movement. Note that, in the example illustrated in FIG. 11, three classifications of "object that outputs sound", "object that speaks natural language", and "object having human face" are used as classifications related to sound output. The above-described three classifications may overlap each other. In addition, in the example illustrated in FIG. 11, three classifications of "living creature", "moving object", and "still object" are used as classifications related to movement.

Herein, when an agent device does not have a function to distinguish a person ("person" in the drawing) as a dialogue target from an "object that speaks natural language", the agent device is potentially triggered by, for example, voice output from a television device or the like and performs a response operation unintended by a user.

Figure 12:
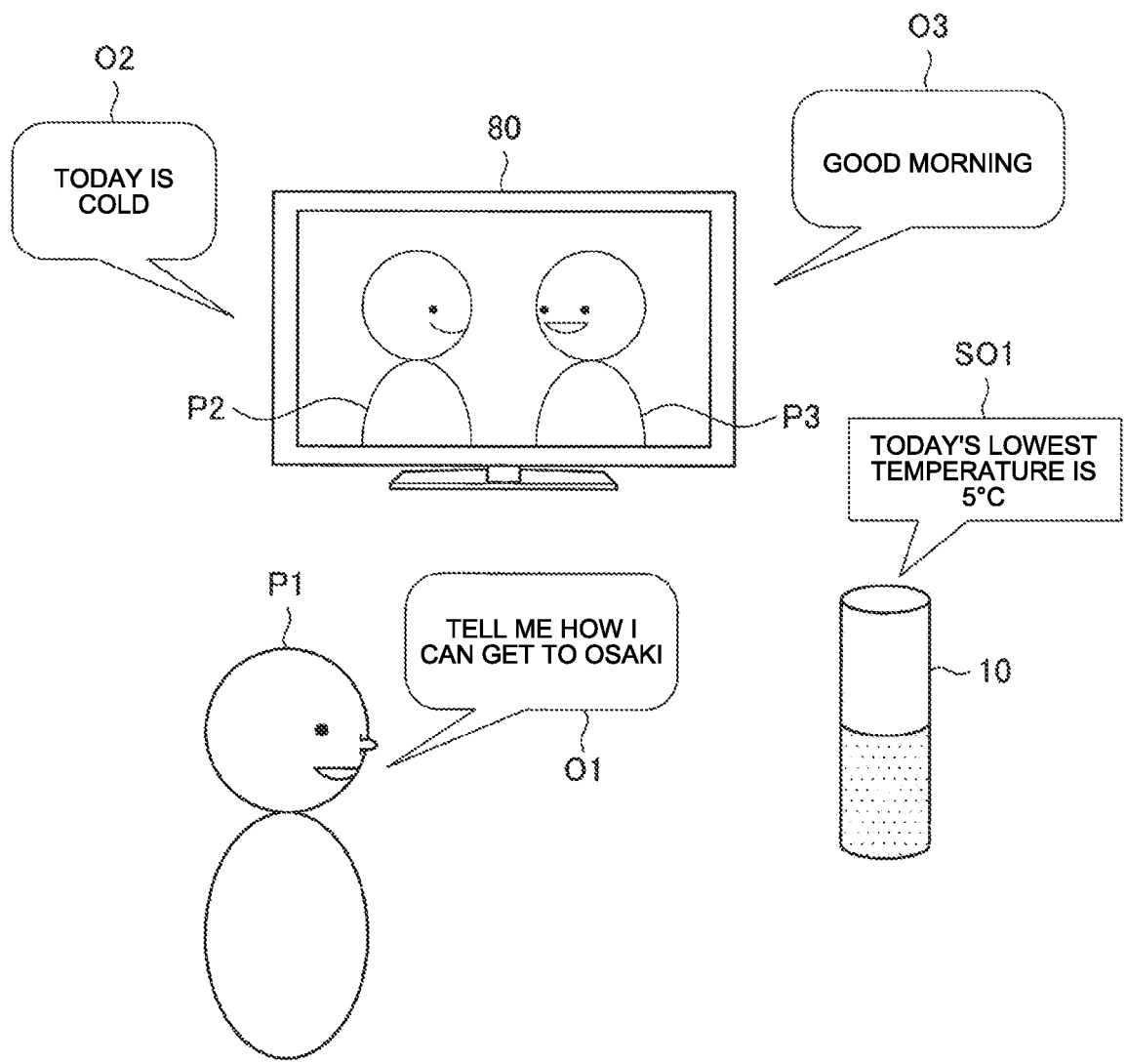
FIG. 12 is a diagram illustrating an example in which a typical agent device wrongly performs a response operation to voice output from a television device.

FIG. 12 is a diagram illustrating an example in which a typical agent device 90 wrongly performs a response operation to voice output from a television device 80. In the example illustrated in FIG. 12, a person P1 as a correct dialogue target performs, to the agent device 90, a speech O1 for querying a way to a destination.

However, the agent device 90 wrongly detects, as a dialogue target, a person P2 in a moving image played back by the television device 80 and performs a voice output SO1 of "Today's lowest temperature is 5° C." in response to a speech O2 of "Today is cold" by the person P2.

In this manner, when the agent device cannot correctly detect a dialogue target, the agent device can wrongly execute an operation unexpected by a user in some cases, which lowers the satisfaction degree of the user and potentially provides damage to the user to an unignorable extent.

In addition, in a case in which the agent device provides active information notification to a detected person as described above, the agent device potentially unintentionally speaks in a room in which no persons are present when the agent device wrongly detects, as a dialogue target, a subject such as a person or a poster in a moving image displayed on a television device or the like.

To avoid such a situation as described above, a method of determining whether a person is a real live person by using temperature detection by, for example, an infrared sensor is assumed. However, when a pet animal or the like is kept in a house, it is difficult to highly accurately detect a dialogue target only from temperature information.

Alternatively, for example, another method of determining whether a target is a real live person based on vital information is assumed. However, acquisition of vital information such as pulse by a non-contact scheme requires the user to intentionally perform, for example, an operation to position the face and the body toward a sensor so that the device can acquire vital information, and application to an agent device naturally used in daily life is difficult.

Alternatively, for example, it is possible to simultaneously capture a visible image and an infrared image, measure vital information such as pulse and body temperature by using the infrared image in a face region detected from the visible image, and determine whether a target is a real live person. However, in this case, whether the visible image and the infrared image detect an identical target needs to be determined, and the accuracy of the determination directly affects the accuracy of the above-described person determination. In addition, in such a method as described above, instruments configured to capture the visible image and the infrared image are both mounted, which leads to increase of manufacturing cost.

The technological idea of the present disclosure is thought of with focus on the situation as described above and enables more highly accurate detection of an operation target. To achieve this, an information processing device that achieves an information processing method according to an embodiment of the present disclosure includes a determination unit configured to determine whether an object that outputs voice is a dialogue target related to voice dialogue based on a result of recognition of an input image, and a dialogue function unit configured to perform control related to the voice dialogue based on determination by the determination unit. The above-described dialogue function unit is characterized to provide a voice dialogue function to the object based on the fact that it is determined by the determination unit that the above-described object is the dialogue target.

In other words, an information processing device according to an embodiment of the present disclosure has a function to perform object recognition of various kinds of instruments in surroundings and determine whether an object that outputs voice, in particular, is a dialogue target. With the information processing device according to an embodiment of the present disclosure, it is possible to achieve a more valuable voice dialogue function by highly accurately determining a dialogue target without cumbering a user and with an inexpensive configuration.

2. First Embodiment

<<2.1. Exemplary Functional Configuration>>

The following describes a first embodiment of the present disclosure. An information processing device 10 according to the present embodiment may be, for example, a stationary agent device disposed in a house or the like. As described above, the information processing device 10 according to the present embodiment has a function to detect a dialogue target such as a person in correct separation from any other voice output object, and can receive a voice input from the dialogue target and can perform a response operation and provide active notification to the dialogue target.

Figure 1:
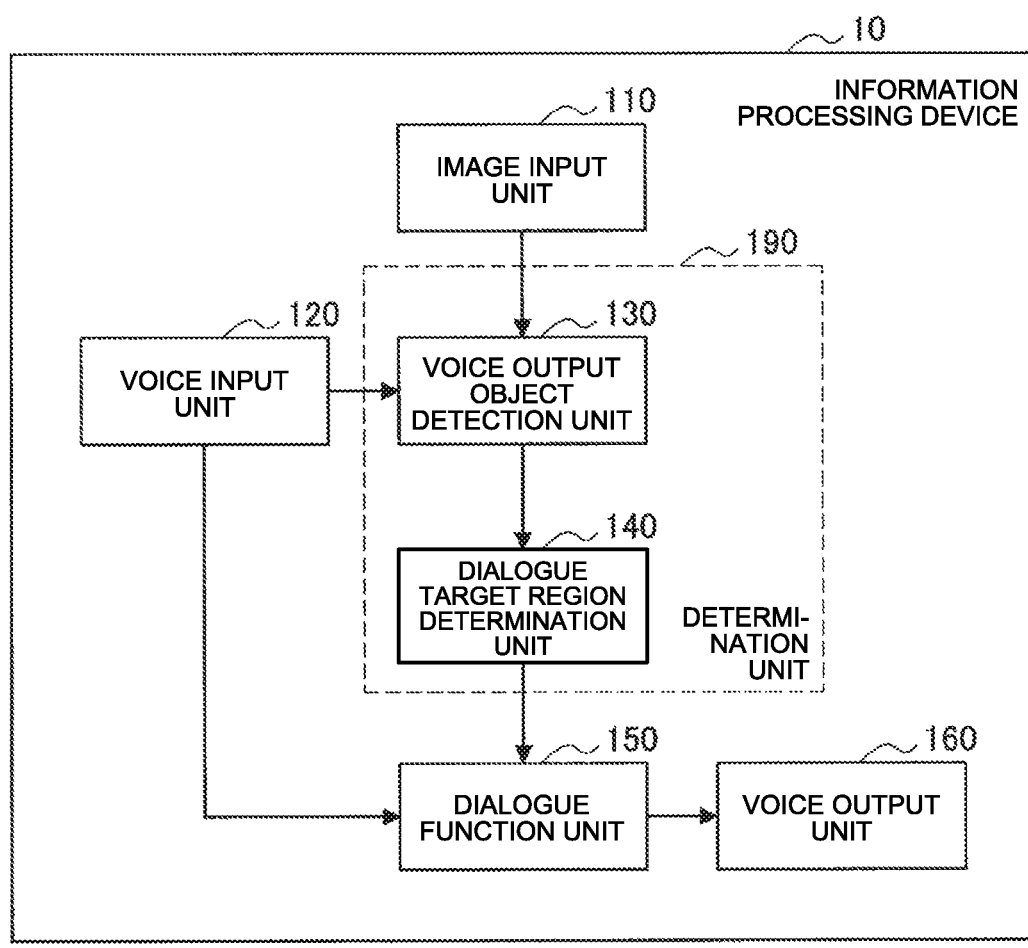
FIG. 1 is a block diagram illustrating an exemplary functional configuration an information processing device according to a first embodiment of the present disclosure.

The following first describes an exemplary functional configuration of the information processing device 10 according to the present embodiment. FIG. 1 is a block diagram illustrating an exemplary functional configuration of the information processing device 10 according to the present embodiment. With reference to FIG. 1, the information processing device 10 according to the present embodiment includes an image input unit 110, a voice input unit 120, a determination unit 190, a dialogue function unit 150, and a voice output unit 160.

(Image Input Unit 110)

The image input unit 110 according to the present embodiment receives an image captured by an image capturing device such as a camera and forwards the image to the determination unit 190. To achieve this, the image input unit 110 according to the present embodiment may include various image capturing devices. The image input unit 110 according to the present embodiment may acquire, through a network, an image captured by an image capturing device outside the information processing device 10.

(Voice Input Unit 120)

The voice input unit 120 according to the present embodiment receives information related to various kinds of sound generated in surroundings and forwards the information to the determination unit 190 and the dialogue function unit 150. To achieve this, the voice input unit 120 according to the present embodiment may include a microphone. The voice input unit 120 according to the present embodiment may acquire, through a network, information of sound collected by a device outside the information processing device 10.

(Determination Unit 190)

The determination unit 190 according to the present embodiment has a function to determine whether an object that outputs voice is a dialogue target related to voice dialogue based on a result of recognition of an input image. The dialogue target according to the present embodiment may be, for example, a person in physical space identical to that of the information processing device 10. Alternatively, the dialogue target according to the present embodiment may be a predetermined device specified in advance.

To achieve the above-described determination, the determination unit 190 according to the present embodiment includes, for example, a voice output object detection unit 130 and a dialogue target region determination unit 140.

(Voice Output Object Detection Unit 130)

The voice output object detection unit 130 according to the present embodiment has a function to perform object recognition based on an image input from the image input unit 110 and detect an object region related to an object that outputs voice.

(Dialogue Target Region Determination Unit 140)

The dialogue target region determination unit 140 according to the present embodiment has a function to specify a dialogue target region related to the dialogue target in the object region detected by the voice output object detection unit 130. For example, the dialogue target region determination unit 140 according to the present embodiment can determine whether the detected object region is a person region. Details of the function of the dialogue target region determination unit 140 according to the present embodiment will be separately described later.

(Dialogue Function Unit 150)

The dialogue function unit 150 according to the present embodiment performs control related to voice dialogue based on determination by the determination unit 190. In this case, the dialogue function unit 150 according to the present embodiment is characterized to provide a voice dialogue function to the object based on the fact that it is determined by the determination unit 190 that a recognized object is the dialogue target.

Specifically, when the determination unit 190 determines that an object is the dialogue target, the dialogue function unit 150 may perform active speech (notification) to the object. On the other hand, when the determination unit 190 determines that the object is not the dialogue target, the dialogue function unit 150 is controlled not to perform active voice output to the object.

When the determination unit 190 determines that an object is the dialogue target, the dialogue function unit 150 may receive voice output from the object and perform a response operation. On the other hand, when the determination unit 190 determines that the object is not the dialogue target, the dialogue function unit 150 is controlled not to perform a response operation to voice output from the object. Note that examples of the above-described response operation widely include outputting of a reply using voice and visual information to a query from a user, and an instrument operation based on an instruction from the user.

With the above-described function of the dialogue function unit 150 according to the present embodiment, it is possible to prevent an operation unexpected by the user and prevent, for example, electric power consumption increase due to an unnecessary response operation by providing a dialogue function only to an object determined to be the dialogue target. Note that details of the function of the dialogue function unit 150 according to the present embodiment will be separately described later.

(Voice Output Unit 160)

The voice output unit 160 according to the present embodiment performs voice output to the dialogue target based on control by the dialogue function unit 150. To achieve this, the voice output unit 160 according to the present embodiment includes a speaker, an amplifier, and the like.

The exemplary functional configuration of the information processing device 10 according to the present embodiment is described above. Note that the configuration described above with reference to FIG. 1 is merely exemplary and the functional configuration of the information processing device 10 according to the present embodiment is not limited to the example. For example, in addition to the above-described configuration, the information processing device 10 according to the present embodiment may further include an input unit for receiving an input operation by the user, an output unit configured to output visual information, and the like. The above-described image capturing function, sound collection function, voice output function, and the like may be achieved by an external device different from the information processing device 10. The functional configuration of the information processing device 10 according to the present embodiment may be flexibly modified in accordance with specifications and operations.

<<2.2. Details of Function of determination Unit 190>>

The following describes details of the function of the determination unit 190 according to the present embodiment. The determination unit 190 according to the present embodiment can specify the dialogue target region in an input image by performing object recognition on the image and determining whether a recognized object outputs voice and whether the recognized object is the dialogue target.

Figures 2, 3:
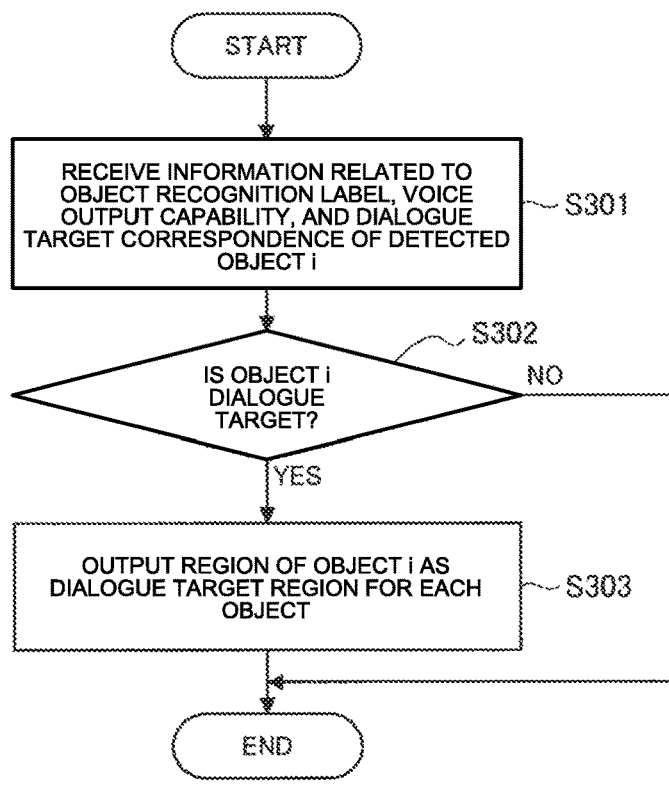
FIG. 2 is a diagram illustrating exemplary voice output capability and dialogue target correspondence of objects according to the present embodiment.
FIG. 3 is a flowchart illustrating the process of dialogue target determination by a determination unit according to the present embodiment.

In this case, the determination unit 190 according to the present embodiment may perform the above-described determination based on, for example, a table as illustrated in FIG. 2. FIG. 2 is a diagram illustrating exemplary voice output capability and dialogue target correspondence of objects according to the present embodiment. FIG. 2 lists, labels of an object recognized by the determination unit 190 according to the present embodiment, in association with the voice output capability and the dialogue target correspondence of the object.

In this manner, the determination unit 190 according to the present embodiment can determine whether a recognized object outputs voice and whether the recognized object is the dialogue target by referring to a table as illustrated in FIG. 2. Note that, in the example illustrated in FIG. 2, the voice output capability of an object that can output natural language is typically set to "1". Alternatively, the table according to the present embodiment may be produced based on whether an object outputs voice irrespective of natural language.

In the example illustrated in FIG. 2, a recognized object is indicated at a general name level, but the table according to the present embodiment may be segmentalized and produced, for example, at a product level.

Note that, to obtain an object recognition label, the determination unit 190 may use an individual object recognition algorithm for each recognition target or may apply a plurality of object recognition labels through a single object recognition algorithm. For example, when individually performing person recognition, the determination unit 190 can label, as a person, the whole of an object physically connected with a face region determined by using a face detection algorithm. Alternatively, determination of a face region and an individual instrument and the like may be simultaneously performed through an algorithm that applies a plurality of object recognition labels. Note that the above-described object recognition may be achieved as a function of the voice output object detection unit 130.

In the example illustrated in FIG. 2, the dialogue target is limited to a person, and only dialogue target correspondence related to person is set to "1". However, the dialogue target according to the present embodiment is not limited to the example. The dialogue target according to the present embodiment may be a set predetermined sound output device.

For example, such a demand that, when a fire alarm outputs voice related to fire occurrence, the information processing device 10 receives the voice and indicates an evacuation path to the user is assumed. In this case, it is possible to achieve an operation as described above by setting dialogue target correspondence related to fire alarm to "1".

When the dialogue target correspondence of fire alarm is set to "1", the information processing device 10 potentially performs active notification to a fire alarm. To prevent such a situation, the dialogue target correspondence according to the present embodiment may be separated into reception target correspondence and notification target correspondence and set.

In this case, the reception target correspondence and the notification target correspondence related to fire alarm may be set to "1" and "0", respectively. With the above-described setting, the determination unit 190 determines that a fire alarm is a reception target but not a notification target, thereby preventing the dialogue function unit 150 from providing unnecessary active notification to the fire alarm.

The following describes the process of dialogue target determination by the determination unit 190 according to the present embodiment. FIG. 3 is a flowchart illustrating the process of the dialogue target determination by the determination unit 190 according to the present embodiment. Note that the following description is made with an example in which the above-described dialogue target region determination unit 140 is a main operator.

With reference to FIG. 3, first, the dialogue target region determination unit 140 receives information related to the object recognition label, the voice output capability, and the dialogue target correspondence of an object i detected by the voice output object detection unit 130 (S301). Note that the dialogue target region determination unit 140 may receive all above-described pieces of information from the voice output object detection unit 130, or may receive the object recognition label of an object detected by the voice output object detection unit 130 and acquire the voice output capability and the dialogue target correspondence from a table as illustrated in FIG. 2 based on the object recognition label.

Subsequently, the dialogue target region determination unit 140 determines whether the object i is the dialogue target based on the information received at step S301 (S302).

If the object i is the dialogue target (YES at S302), the dialogue target region determination unit 140 outputs the object region related to the object i as the dialogue target region for each object (S303).

On the other hand, if the object i is not the dialogue target (NO at S302), the dialogue target region determination unit 140 ends the determination processing.

<<2.3. Details of Function of Dialogue Function Unit 150>>

Figure 4:
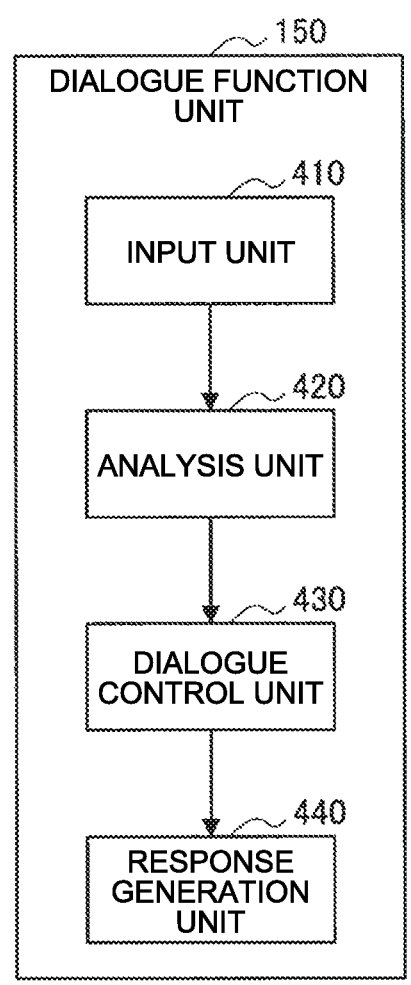
FIG. 4 is a block diagram illustrating an exemplary functional configuration of a dialogue function unit according to the present embodiment.

The following describes the function of the dialogue function unit 150 according to the present embodiment in detail. FIG. 4 is a block diagram illustrating an exemplary functional configuration of the dialogue function unit 150 according to the present embodiment. With reference to FIG. 4, the dialogue function unit 150 according to the present embodiment includes an input unit 410, an analysis unit 420, a dialogue control unit 430, and a response generation unit 440.

(Input Unit 410)

The input unit 410 according to the present embodiment receives a result of determination by the determination unit 190, voice acquired by the voice input unit 120, an image acquired by the image input unit 110, sensor information, and the like.

(Analysis Unit 420)

The analysis unit 420 according to the present embodiment executes analysis processing based on various kinds of input information received by the input unit 410. The analysis unit 420 executes, for example, voice recognition processing to convert voice into text information. In addition, the analysis unit 420 may analyze speech intention and the like from the above-described text.

(Dialogue Control Unit 430)

The dialogue control unit 430 according to the present embodiment determines, based on a result of analysis by the analysis unit 420, a response operation to be executed.

(Response Control Unit 440)

The response generation unit 440 according to the present embodiment generates response information based on control by the dialogue control unit 430. The above-described response information includes, for example, voice, text, an image, and a control signal related to an instrument operation. The response generation unit 440 transmits the generated response information to a control target such as the voice output unit 160 and causes the control target to operate based on the response information.

The basic function of each component included in the dialogue function unit 150 according to the present embodiment is described above. The following describes, with examples, a case in which each above-described configuration uses, for operation, a result of determination by the determination unit 190.

When one or more dialogue target regions of an object cannot be specified by the determination unit 190, for example, the response generation unit 440 does not necessarily need to generate response information nor transmit generated response information to a control target.

In addition, when one or more dialogue target regions of an object cannot be specified by the determination unit 190, for example, the dialogue control unit 430 does not necessarily need to execute processing related to response operation determination.

When one or more dialogue target regions of an object cannot be specified by the determination unit 190, the analysis unit 420 does not necessarily need to execute analysis processing based on input information.

When one or more dialogue target regions of an object cannot be specified by the determination unit 190, the input unit 410 may discard input information.

In this manner, at either processing stage based on a result of determination by the determination unit 190, the dialogue function unit 150 according to the present embodiment can perform control to prevent a response operation to an object that is not the dialogue target.

As described above, with the information processing device 10 according to the present embodiment, it is possible to highly accurately determine whether an object that outputs voice is the dialogue target, thereby effectively preventing false operation and the like.

3. Second Embodiment

<<3.1. Overview>>

The following describes a second embodiment of the present disclosure. In the above-described first embodiment, a case in which the information processing device 10 specifies the dialogue target region based on an object recognition result is described.

Recently, a large number of devices that output a moving image including appearance and voice of a person are widely available. Examples of the above-described devices include a television device as well as a personal computer (PC), a tablet, a smartphone, a projector, and a videophone. Accordingly, in some assumed cases, it is difficult to distinguish, only based on an object recognition result, a person in the above-described moving image from a person actually existing in physical space.

Thus, the information processing device 10 according to the second embodiment of the present disclosure may perform dialogue target determination based on moving body recognition in addition to object recognition described in the first embodiment. In particular, the information processing device 10 according to the present embodiment can determine whether an object including the face of a person is a real live person. Specifically, by using a result of the moving body recognition for the determination, the information processing device 10 according to the present embodiment can discriminate a person displayed in a moving image, a poster, or the like from a person actually existing in physical space.

The following describes in detail the above-described characteristic of the information processing device 10 according to the present embodiment. Note that the following description is made mainly on any difference from the first embodiment and omits duplicate description of configurations, functions, effects, and the like common to those in the first embodiment.

<<3.2. Exemplary Functional Configuration>>

Figure 5:
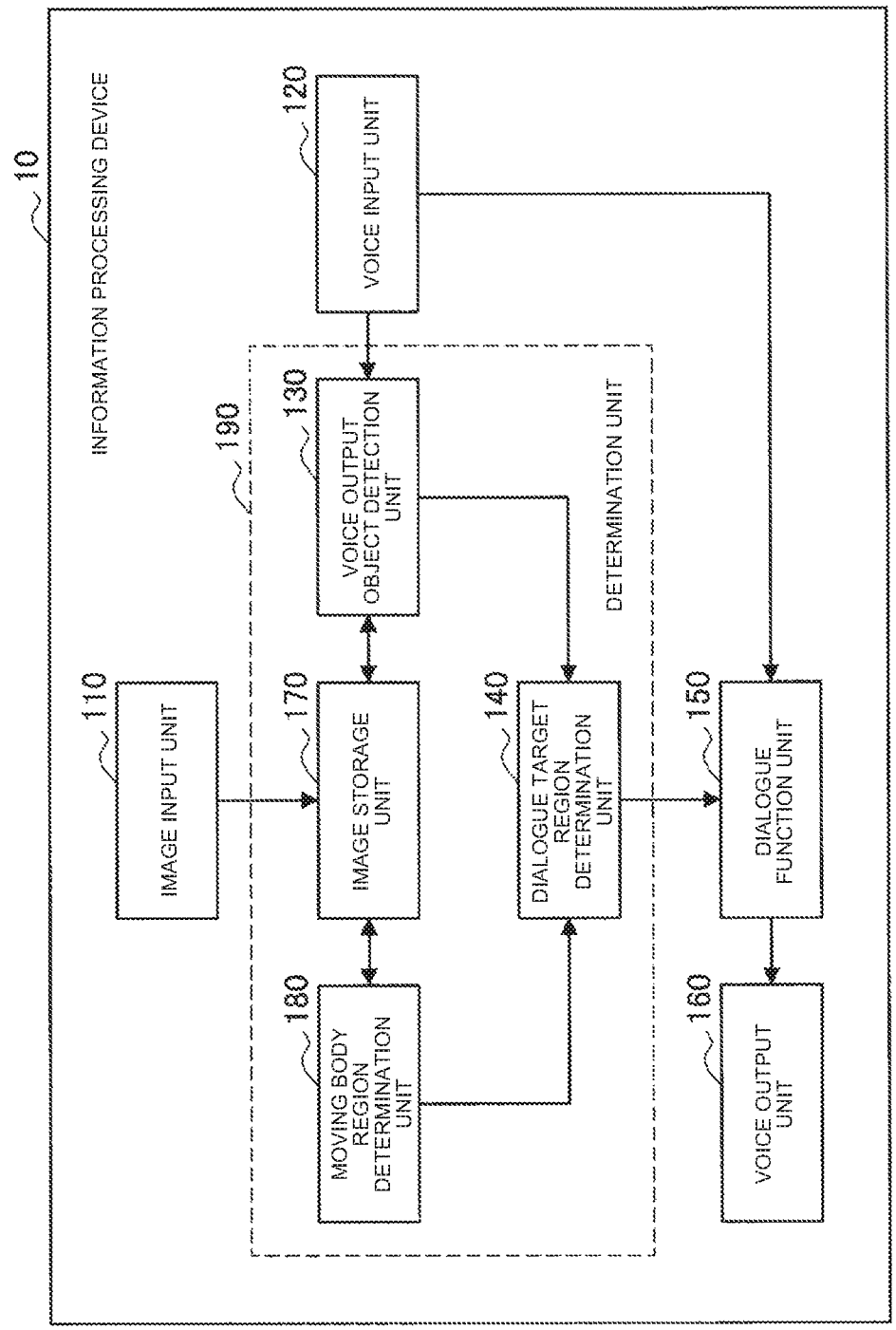
FIG. 5 is a block diagram illustrating an exemplary functional configuration of the information processing device 10 according to a second embodiment of the present disclosure.

The following first describes the exemplary functional configuration of the information processing device 10 according to the present embodiment. FIG. 5 is a block diagram illustrating an exemplary functional configuration of the information processing device 10 according to the present embodiment. With reference to FIG. 5, the determination unit 190 of the information processing device 10 according to the present embodiment further includes an image storage unit 170 and a moving body region determination unit 180 in addition to the configuration described in the first embodiment.

(Image Storage Unit 170)

Figure 6:
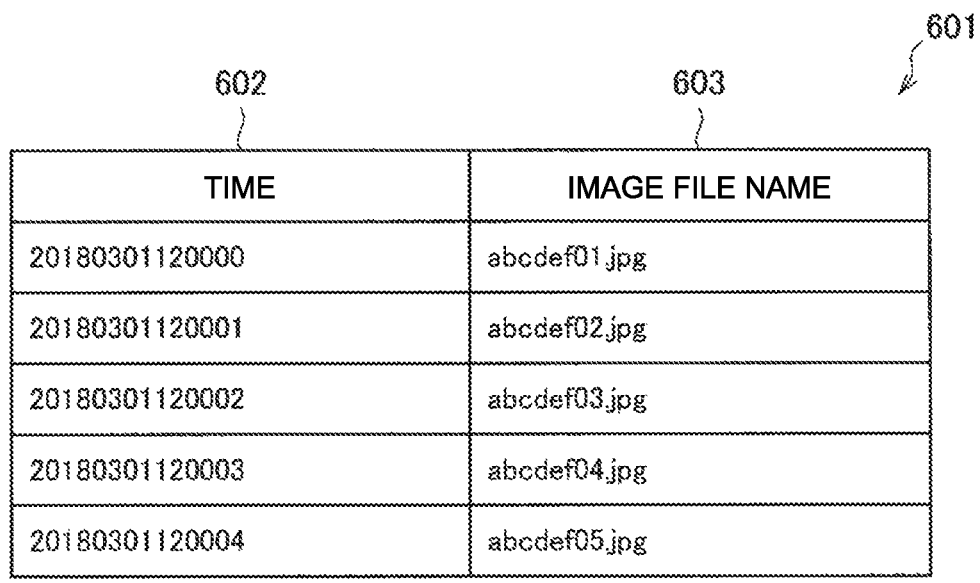
FIG. 6 illustrates an exemplary storage format of images stored in an image storage unit according to the present embodiment.

The image storage unit according to the present embodiment includes a database for storing an image input from the image input unit 110. FIG. 6 illustrates an exemplary storage format of images stored in the image storage unit 170 according to the present embodiment. With reference to FIG. 6, an image input from the image input unit 110, together with a time 602 and an image file name 603, is stored in a database 601 included in the image storage unit 170 according to the present embodiment. Note that the example illustrated in FIG. 6 indicates a case in which the time 602 is stored in the format of "yyyyMMddHHmmss".

With reference to FIG. 6, input images may be stored in the order of inputting in the image storage unit 170 according to the present embodiment.

(Moving Body Region Determination Unit 180)

The moving body region determination unit 180 according to the present embodiment has a function to determine a moving body region based on images input to in a temporally sequential manner, in other words, images stored in the image storage unit 170. The moving body region determination unit 180 according to the present embodiment may track a determined moving body from its past images stored in the image storage unit 170 to its current input image and may output the operation range of the moving body.

The dialogue target region determination unit 140 according to the present embodiment can integrally specify the dialogue target region based on the moving body region determined by the moving body region determination unit 180 and the object region determined by the voice output object detection unit 130.

In addition, the dialogue target region determination unit 140 according to the present embodiment can highly accurately determine the dialogue target region based on the moving-body operation range output from the moving body region determination unit 180.

<<3.3. Details of Function of Moving Body Region Determination Unit 180>>

Figure 7:
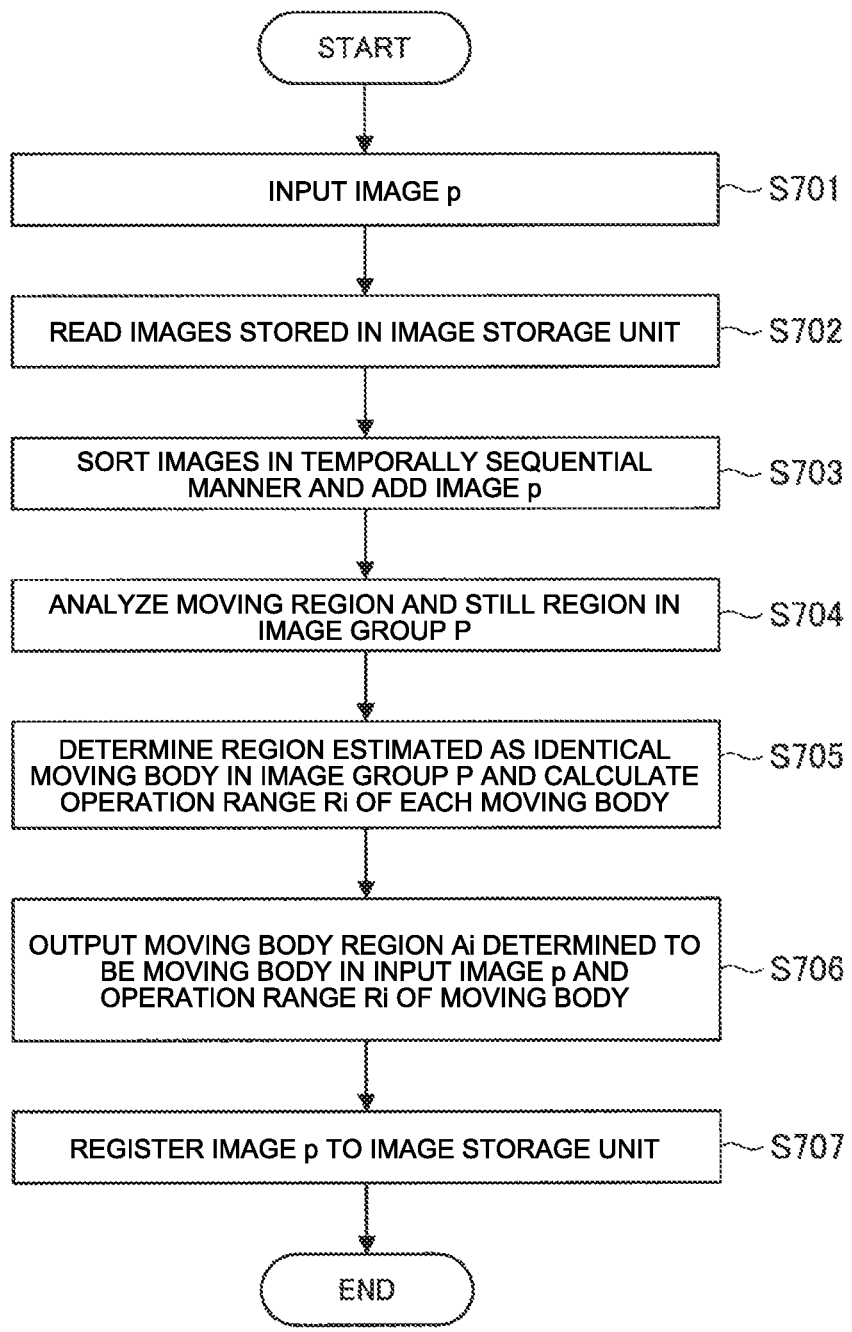
FIG. 7 is a flowchart illustrating the process of operation of an operation region determination unit according to the present embodiment.

The following describes in detail the function of the moving body region determination unit 180 according to the present embodiment. FIG. 7 is a flowchart illustrating the process of operation of the moving body region determination unit 180 according to the present embodiment.

With reference to FIG. 7, first, a latest image p received by the image input unit 110 is input to the moving body region determination unit 180 (S701).

Subsequently, the moving body region determination unit 180 reads images stored in the image storage unit 170 (S702).

Subsequently, the moving body region determination unit 180 sorts the images read at step at S702 in a temporally sequential manner and adds the latest image p input at step at S701 to the end, thereby obtaining an image group P (S703).

Subsequently, the moving body region determination unit 180 analyzes a moving region and a still region in the image group P obtained at step S703 (S704). In this case, the moving body region determination unit 180 may analyze the above-described regions by, for example, handling the image group P as still images continuous in a temporally sequential manner to calculate their difference. Alternatively, the moving body region determination unit 180 may perform the above-described region analysis by, for example, inputting the image group P as one moving image set and analyzing the feature amount of the entire set.

Subsequently, the moving body region determination unit 180 determines a region estimated as an identical moving body in the image group P and calculates an operation range Ri of the above-described moving body based on the image group P (S705).

Subsequently, the moving body region determination unit 180 outputs, for each moving body, information of a moving body region Ai determined to be the moving body at step S704 in the image p input at step S701 and the operation range Ri related to the moving body (S706).

Subsequently, the moving body region determination unit 180 registers the image p to the image storage unit 170 (S707).

<<3.4. Details of Function of Dialogue Target Region Determination Unit 140>>

Figure 8:
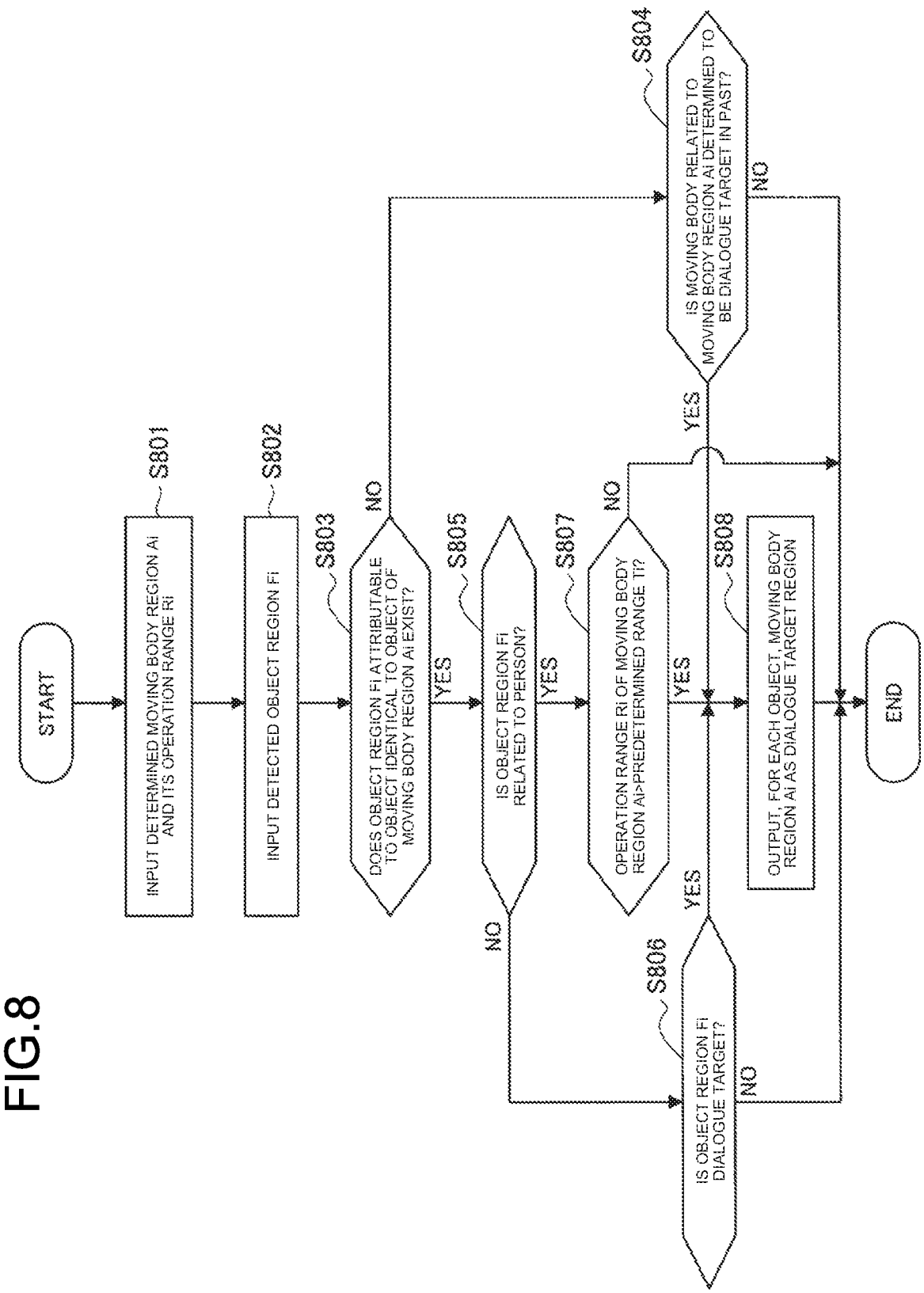
FIG. 8 is a flowchart illustrating the process of operation of a dialogue target region determination unit according to the present embodiment.

The following describes in detail the function of the dialogue target region determination unit 140 according to the present embodiment. FIG. 8 is a flowchart illustrating the process of operation of the dialogue target region determination unit 140 according to the present embodiment.

With reference to FIG. 8, first, the moving body region Ai determined by the moving body region determination unit 180 and the operation range Ri are input to the dialogue target region determination unit 140 (S801).

Subsequently, an object region Fi detected by the voice output object detection unit 130 is input to the dialogue target region determination unit 140 (S802).

Subsequently, the dialogue target region determination unit 140 determines whether the moving body region Ai input at step S801 and the object region Fi input at step S802 are attributable to an identical object (S803). In other words, the dialogue target region determination unit 140 determines whether a moving body related to the moving body region Ai is identical to an object related to the object region Fi.

In this case, the dialogue target region determination unit 140 may determine that the moving body related to the moving body region Ai is identical to the object related to the object region Fi, for example, when the moving body region Ai and the object region Fi at least partially overlap each other.

If it cannot be determined that the moving body related to the moving body region Ai is identical to the object related to the object region Fi (NO at S803), the dialogue target region determination unit 140 subsequently determines whether the moving body related to the moving body region Ai is determined to be the dialogue target in the past (S804).

If the moving body related to the moving body region Ai is not determined to be the dialogue target in the past (NO at S804), the dialogue target region determination unit 140 determines that the moving body related to the moving body region Ai is not the dialogue target, and ends the processing.

On the other hand, if the moving body related to the moving body region Ai is determined to be the dialogue target in the past (YES at S804), the dialogue target region determination unit 140 specifies the moving body region Ai as the dialogue target region (S808) and ends the processing.

Figure 9:
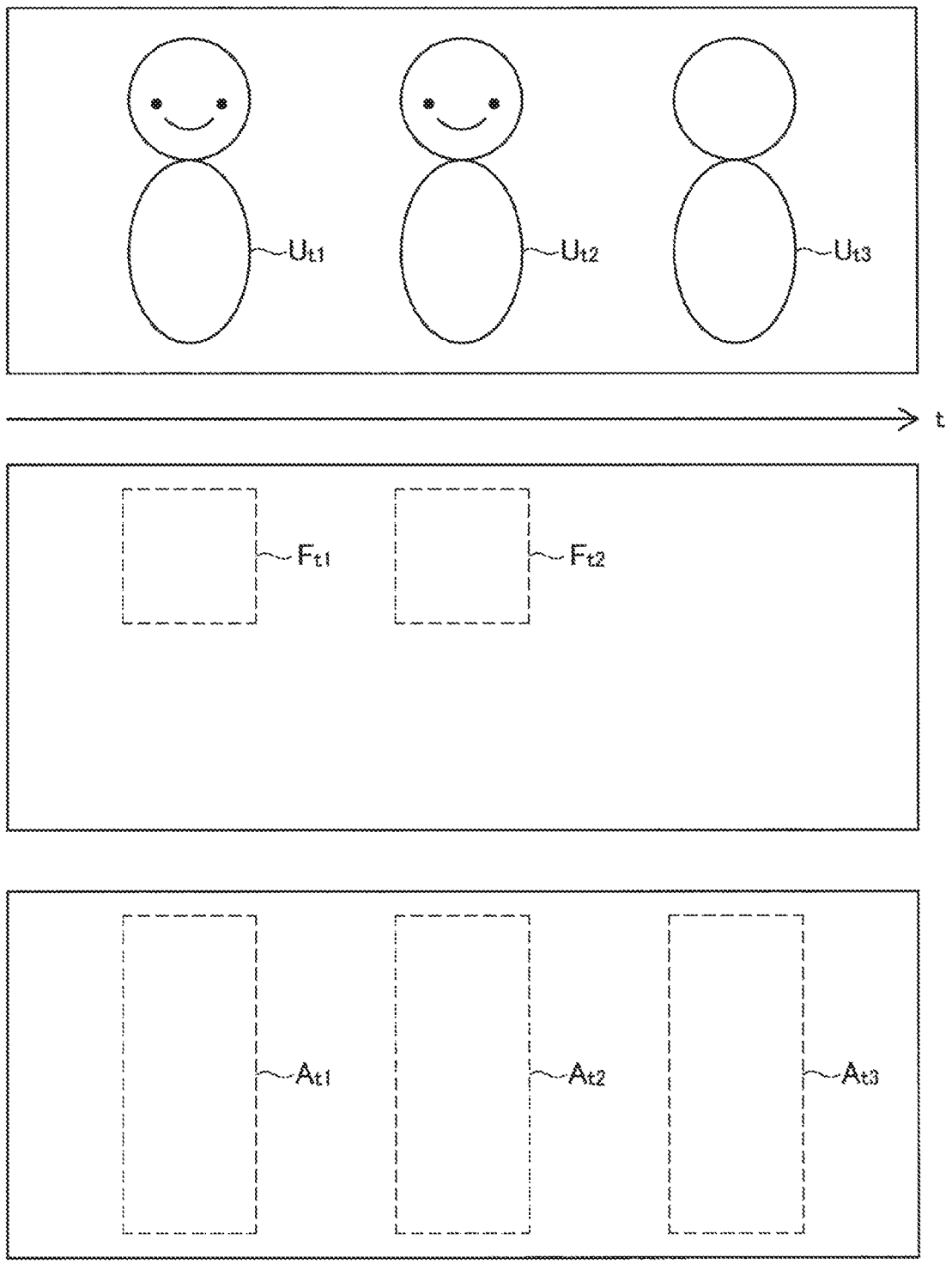
FIG. 9 is a diagram for description of overlapping of a moving body region and an object region according to the present embodiment.

The following describes the determination at steps S803 and S804 in detail with reference to FIG. 9.

FIG. 9 is a diagram for description of overlapping of the moving body region and the object region according to the present embodiment. The upper part of FIG. 9 illustrates exemplary person operation in a temporally sequential manner. Person $U_{t1}$ is an image of user U at time t1, person $U_{t2}$ is an image of user U at time t2, and person $U_{t3}$ is an image of user U at time t3.

The middle part of FIG. 9 illustrates exemplary object regions Fi detected based on the images of user U illustrated in the upper part. In the example illustrated in FIG. 9, object regions $F_{t1}$ and $F_{t2}$ are detected at times t1 and t2, respectively, at which images of the face of user U are captured.

The lower part of FIG. 9 illustrates exemplary moving body regions Fi detected based on the images of user U illustrated in the upper part. In the example illustrated in FIG. 9, object regions $F_{t1}$ to $F_{t3}$ are detected based on the images of user U at times t1 to T3, respectively.

In comparison between the object region Fi and the moving body region Ai, no image of the face of user U is captured and thus no object region Fi is detected at time t3.

In such a case, the dialogue target region determination unit 140 may determine whether the moving body region Ai and the object region Fi at least partially overlap each other at a time point in the past and the moving body region Ai is specified as the dialogue target region. In this case, for example, when the moving body region Ai and the object region Fi at least partially overlap each other as illustrated at a time point in the past and the moving body region Ai is specified as the dialogue target region, the dialogue target region determination unit 140 can specify moving body region $A_{t3}$ in the latest image as the dialogue target region.

With the above-described function of the dialogue target region determination unit 140 according to the present embodiment, the determination accuracy can be prevented from decreasing when the object region Fi temporarily cannot be detected because, for example, the user faces backward.

The subsequent process of operation by the dialogue target region determination unit 140 will be described with reference to FIG. 8 again.

If it is determined that the moving body related to the moving body region Ai is identical to the object related to the object region Fi at step at S803 (YES at S803), the dialogue target region determination unit 140 subsequently determines whether the object related to the object region Fi is a person (S805).

If the object related to the object region Fi is not a person (NO at S805), the dialogue target region determination unit 140 subsequently determines whether the object related to the object region Fi is the dialogue target (S806).

If the object related to the object region Fi is not the dialogue target (NO at S806), the dialogue target region determination unit 140 ends the processing.

On the other hand, if it is determined that the object related to the object region Fi is the dialogue target (YES at S806), the dialogue target region determination unit 140 specifies the moving body region Ai as the dialogue target region (S808) and ends the processing.

If it is determined that the object related to the object region Fi is a person at step at S804 (YES at S805), the dialogue target region determination unit 140 subsequently determines whether the operation range Ri of the moving body region Ai exceeds a predetermined range Ti (S807).

If the operation range Ri of the moving body region Ai exceeds the predetermined range Ti (YES at S807), the dialogue target region determination unit 140 determines that the moving body is a person, specifies the moving body region Ai as the dialogue target region (S808), and ends the processing.

The above-described determination is based on an assumption that the operation range of a person actually existing in physical space is typically to be significantly larger than that of a person in a moving image.

Note that the above-described predetermined range Ri may be a constant value set in advance or may be determined based on object recognition. For example, when an object is recognized as a television device, the predetermined range Ri may be determined based on the size of the display region of the television device.

In other words, when the operation range Ri of the moving body region Ai does not exceed a region corresponding to a television device or the like, the dialogue target region determination unit 140 can determine that the moving body region Ai is a subject in a moving image.

On the other hand, when the operation range Ri of the moving body region Ai exceeds a region corresponding to an object, the dialogue target region determination unit 140 can determine that the moving body region Ai corresponds to a person existing in physical space. With the above-described function of the dialogue target region determination unit 140 according to the present embodiment, it is possible to highly accurately detect a person existing in physical space when the person is positioned in a direction in which a television device or the like is positioned.

The process of operation of the dialogue target region determination unit 140 according to the present embodiment is described above. Note that the function of the dialogue target region determination unit 140 according to the present embodiment is not limited to the processing illustrated in the flowchart.

The dialogue target region determination unit 140 according to the present embodiment may register the above-described determination and recognition results to the image storage unit 170 and reuse the results in subsequent analysis. For example, the dialogue target region determination unit 140 may exclude the moving body region corresponding to a following object that follows a moving body determined to be the dialogue target, from the dialogue target region corresponding to the moving body.

With the above-described function of the dialogue target region determination unit 140 according to the present embodiment, it is possible to perform control not to receive voice output from, for example, a smartphone possessed by a person.

The dialogue target region determination unit 140 according to the present embodiment may have a function to reset the determination and recognition results when the position of the information processing device 10 is changed. This is because the change causes change of the position of the information processing device 10 relative to an already recognized object.

In some assumed cases, for example, the user desires to provide an instruction to the information processing device 10 or acquire information from the information processing device 10 through video of a videophone or the like. Thus, when it is estimated that voice output from a predetermined device is registered user voice, the determination unit 190 according to the present embodiment may determine the predetermined device as the dialogue target.

Figure 10:
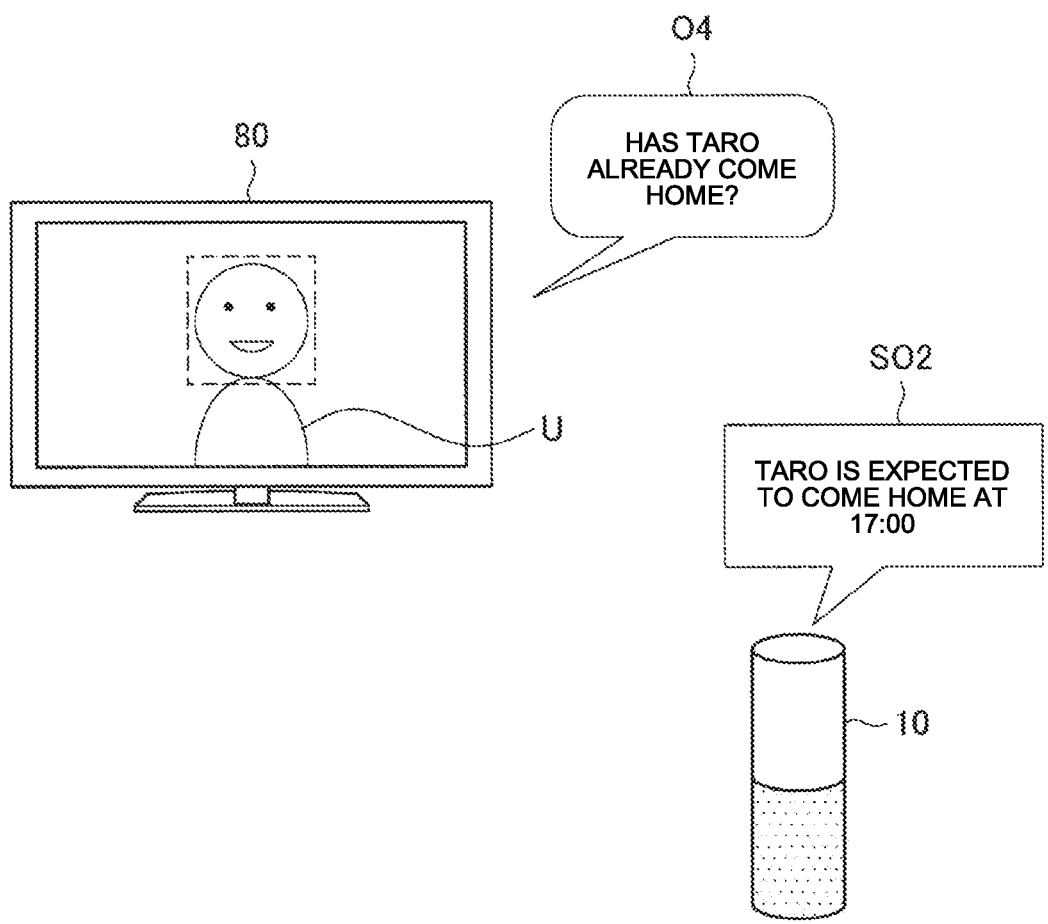
FIG. 10 is a diagram for description of use of the information processing device 10 through video according to the present embodiment.

FIG. 10 is a diagram for description of use of the information processing device 10 through video according to the present embodiment. FIG. 10 illustrates an example in which user U performs speech 04 to the information processing device 10 through a moving image displayed on the television device 80 and obtains a reply by voice output SO2 from the information processing device 10.

In this case, the determination unit 190 according to the present embodiment may estimate that voice output from the television device 80 is voice of the user as the dialogue target by recognizing the face of user U displayed on the television device 80. Alternatively, the determination unit 190 may perform speaker recognition based on voice output from the television device 80 to estimate that the voice is voice of the user.

In this manner, with the function of the determination unit 190 according to the present embodiment, it is possible to correctly recognize a user who desires to remotely use the information processing device 10 through video, thereby achieving a highly valuable dialogue function.

4. Exemplary Hardware Configuration

Figure 13:
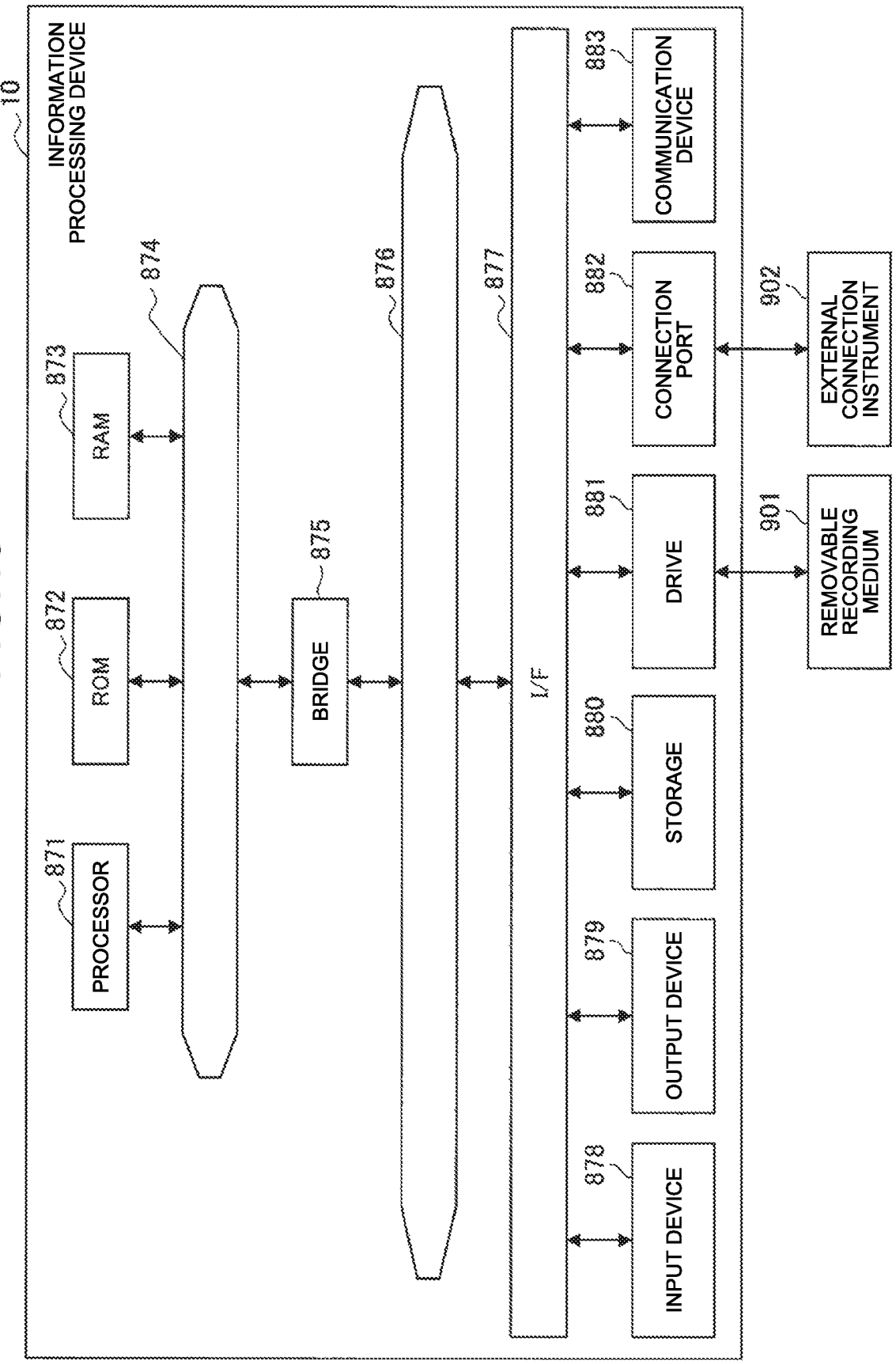
FIG. 13 is a diagram illustrating an exemplary hardware configuration of the information processing device according to an embodiment of the present disclosure.

The following describes an exemplary hardware configuration of the information processing device 10 according to an embodiment of the present disclosure. FIG. 13 is a block diagram illustrating an exemplary hardware configuration of the information processing device 10 according to the embodiment of the present disclosure. With reference to FIG. 13, the information processing device 10 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated herein is exemplary, and some of the components may be omitted. In addition, a component other than the components illustrated herein may be provided.

(Processor 871)

The processor 871 functions, for example, as an arithmetic processing device or a control device and controls the whole or part of the operation of each component based on various computer programs recorded in the ROM 872, the RAM 873, the storage 880, and a removable recording medium 901.

(ROM 872 and RAM 873)

The ROM 872 is a unit configured to store computer programs read by the processor 871, data used in calculation, and the like. The RAM 873 temporarily or permanently stores, for example, computer programs read by the processor 871, various parameters that change as appropriate when the computer programs are executed, and the like.

(Host Bus 874, Bridge 875, External Bus 876, and Interface 877)

For example, the processor 871, the ROM 872, and the RAM 873 are connected with one another through the host bus 874 through which fast data transmission is possible. Meanwhile, for example, the host bus 874 is connected with the external bus 876, the speed of data transmission through which is relatively low, through the bridge 875. The external bus 876 is connected with various kinds of components through the interface 877.

(Input Device 878)

For example, a mouse, a keyboard, a touch panel, a button, a switch, and a lever are used as the input device 878. In addition, a remote controller capable of transmitting a control signal by using infrared waves or other radio waves is used as the input device 878 in some cases. In addition, a voice input device such as a microphone is included in the input device 878.

(Output Device 879)

The output device 879 is a device capable of visually or audibly notifying a user of acquired information and is, for example, a display device such as a cathode ray tube (CRT), an LCD, or an organic EL, an audio output device such as a speaker or a headphone, a printer, a cellular phone, or a facsimile. The output device 879 according to the present disclosure includes various kinds of vibration devices capable of outputting tactile stimulation.

(Storage 880)

The storage 880 is a device for storing various kinds of data. For example, a magnetic storage device such as a hard disk drive (HDD), a semiconductor storage device, an optical storage device, or a magneto-optical storage device is used as the storage 880.

(Drive 881)

The drive 881 is, for example, a device configured to read information recorded in the removable recording medium 901 such as a magnetic disk, an optical disk, a magneto optical disc, or a semiconductor memory, or write information to the removable recording medium 901.

(Removable Recording Medium 901)

The removable recording medium 901 is, for example, a DVD media, a Blu-ray (registered trademark) media, a HD DVD media, or various semiconductor storage medium. The removable recording medium 901 may be, for example, an IC card on which a non-contact IC chip is mounted, or an electronic device.

(Connection Port 882)

The connection port 882 is a port for connecting an external connection instrument 902, such as a universal serial bus (USB) port, an IEEE1394 port, a small computer system interface (SCSI), an RS-232C port, or an optical audio terminal.

(External Connection Instrument 902)

The external connection instrument 902 is, for example, a printer, a portable music player, a digital camera, a digital video camera, or an IC recorder.

(Communication Device 883)

The communication device 883 is a communication device for connecting to a network and is, for example, a wired or wireless LAN, Bluetooth (registered trademark), or wireless USB (WUSB) communication card, an optical communication router, an asymmetric digital subscriber line (ADSL) router, or various communication modems.

5. Conclusion

As described above, the information processing device 10 according to an embodiment of the present disclosure includes the determination unit 190 configured to determine whether an object that outputs voice is a dialogue target related to voice dialogue based on a result of recognition of an input image, and the dialogue function unit 150 configured to perform control related to voice dialogue based on determination by the determination unit 190. The dialogue function unit 150 according to an embodiment of the present disclosure is characterized to provide the voice dialogue function to the above-described object based on the fact that it is determined by the determination unit 190 that the object is the dialogue target. With this configuration, it is possible to more highly accurately detect an operation target.

Preferable embodiments of the present disclosure are described above in detail with reference to the accompanying drawings, but the technical scope of the present disclosure is not limited to such examples. Various changes and modifications could be thought of by a person having typical knowledge in the technical field of the present disclosure within the range of the technical idea written in the claims, and it should be understood that these changes and modifications belong to the technical scope of the present disclosure.

Effects stated in the present specification are explanatory or exemplary but not restrictive. Thus, the technology according to the present disclosure achieves, together with or in place of the above-described effects, any other effect that is obvious to the skilled person in the art from description of the present specification.

In addition, a computer program for causing hardware such as a CPU, a ROM, and a RAM built in a computer to achieve a function equivalent to that of any component included in the information processing device 10 may be produced, and a computer-readable recording medium in which the computer program is recorded may be provided.

The steps of each processing performed by the information processing device 10 in the present specification do not necessarily need to be processed in a temporally sequential manner in the order written in the corresponding flowchart. For example, the steps of each processing performed by the information processing device 10 may be processed in an order different from the order written in the corresponding flowchart, or may be processed in parallel.

Note that configurations as described below belong to the technical scope of the present disclosure.

(1)

An information processing device comprising:

a determination unit configured to determine whether an object that outputs voice is a dialogue target related to voice dialogue based on a result of recognition of an input image; and a dialogue function unit configured to perform control related to the voice dialogue based on determination by the determination unit, wherein the dialogue function unit provides a voice dialogue function to the object based on a fact that it is determined by the determination unit that the object is the dialogue target.

(2)

The information processing device according to (1), wherein the dialogue function unit does not perform active voice output to the object based on a fact that it is determined by the determination unit that the object is not the dialogue target.

(3)

The information processing device according to (1) or (2), wherein the dialogue function unit does not respond to voice output from the object based on a fact that it is determined by the determination unit that the object is not the dialogue target.

(4)

The information processing device according to any one of (1) to (3), wherein the determination unit determines whether the object is a reception target or notification target related to the voice dialogue, and when the determination unit determines that the object is the reception target, the dialogue function unit receives voice output from the object, and when the determination unit determines that the object is the notification target, the dialogue function unit performs active voice output to the object.

(5)

The information processing device according to any one of (1) to (4), wherein the determination unit determines that a person in physical space is the dialogue target.

(6)

The information processing device according to any one of (1) to (5), wherein the determination unit determines that a predetermined device specified in advance is the dialogue target.

(7)

The information processing device according to (6), wherein, when it is estimated voice output from the predetermined device is registered user voice, the determination unit determines that the predetermined device is the dialogue target.

(8)

The information processing device according to any one of (1) to (7), wherein the determination unit includes a voice output object detection unit configured to detect an object region related to the object based on the image, and a dialogue target region determination unit configured to specify a dialogue target region related to the dialogue target in the object region detected by the voice output object detection unit.

(9)

The information processing device according to (8), wherein the determination unit further includes a moving body region determination unit configured to determine a moving body region based on the images continuously input in a temporally sequential manner, and the dialogue target region determination unit specifies the dialogue target region based on the moving body region and the object region.

(10)

The information processing device according to (9), wherein the dialogue target region determination unit determines whether a moving body related to the moving body region is identical to the object related to the object region, and specifies the dialogue target region based on a result of the determination.

(11)

The information processing device according to (10), wherein the dialogue target region determination unit determines that the moving body and the object are identical to each other based on a fact that the moving body region and the object region at least partially overlap each other, and specifies the moving body region as the dialogue target region.

(12)

The information processing device according to (11), wherein, when the moving body related to the moving body region is determined to be the dialogue target in past, the dialogue target region determination unit specifies the moving body region as the dialogue target region.

(13)

The information processing device according to any one of (9) to (12), wherein the dialogue target region determination unit specifies the dialogue target region based on an operation range of the moving body region.

(14)

The information processing device according to (13), wherein the dialogue target region determination unit specifies the moving body region as the dialogue target region based on a fact that the operation range exceeds a threshold.

(15)

The information processing device according to (13) or (14), wherein, when the operation range does not exceed a region corresponding to the object, the dialogue target region determination unit determines that the moving body region is not the dialogue target region.

(16)

The information processing device according to (10) or (11), wherein, when the dialogue target region determination unit determines that the moving body and the object are identical to each other, the dialogue target region determination unit specifies the moving body region as the dialogue target based on a fact that the object is the dialogue target.

(17)

The information processing device according to (10) or (11), wherein, when the dialogue target region determination unit determines that the moving body and the object are identical to each other, the dialogue target region determination unit specifies the moving body region as the dialogue target based on a fact that the object is a person.

(18)

The information processing device according to any one of (9) to (17), wherein the dialogue target region determination unit excludes, from the dialogue target region, the moving body region corresponding to a following object that follows the object determined to be the dialogue target.

(19)

The information processing device according to any one of (1) to (18), wherein, when disposition of the information processing device is changed, the determination unit resets a determination result related to the dialogue target.

(20)

An information processing method executed by a processor, the information processing method comprising:

determining whether an object that outputs voice is a dialogue target related to voice dialogue based on a result of recognition of an input image; and performing control related to the voice dialogue based on a result of the determining, the performing of the control further includes providing a voice dialogue function to the object based on a fact that it is determined that the object is the dialogue target.

REFERENCE SIGNS LIST

10 information processing device
110 image input unit
120 voice input unit 130 voice output object detection unit
140 dialogue target region determination unit
150 dialogue function unit
160 voice output unit
170 image storage unit
180 moving body region determination unit
190 determination unit

The invention claimed is:

1. An information processing device, comprising:
a determination unit configured to receive a plurality of images continuously in a temporally sequential manner, wherein the determination unit includes:
  a voice output object detection unit configured to detect, based on an image of the plurality of images, an object region related to an object that outputs voice;
  a moving body region determination unit configured to determine a moving body region based on the plurality of images continuously received in the temporally sequential manner; and
  a dialogue target region determination unit configured to:
    determine whether the object that outputs the voice is a dialogue target related to voice dialogue, wherein the determination of the dialogue target is based on the image; and
    specify a dialogue target region related to the dialogue target in the object region,
      wherein the dialogue target region is specified based on the moving body region, the object region, and the determination that the object is the dialogue target; and
a dialogue function unit configured to:
  execute control related to the voice dialogue based on the dialogue target region and the determination of whether the object is the dialogue target; and
  output a voice dialogue function to the object in a case where the object is determined as the dialogue target.

2. The information processing device according to claim 1, wherein the dialogue function unit does not perform active voice output to the object in a case where the object is different from the dialogue target.

3. The information processing device according to claim 1, wherein the dialogue function unit does not respond to the voice output from the object in a case where the object is different from the dialogue target.

4. The information processing device according to claim 1, wherein
the determination unit is further configured to determine whether the object is a reception target or a notification target related to the voice dialogue,
in a case where the object is determined as the reception target, the dialogue function unit is further configured to receive the voice output from the object, and
in a case where the object is determined as the notification target, the dialogue function unit is further configured to execute active voice output to the object.

5. The information processing device according to claim 1, wherein the determination unit is further configured to determine that a person in a physical space of the information processing device is the dialogue target.

6. The information processing device according to claim 1, wherein the determination unit is further configured to determine that a determined device specified in advance is the dialogue target.

7. The information processing device according to claim 6, wherein, in a case where a voice output from the determined device is registered user voice, the determination unit is further configured to determine that the determined device is the dialogue target.

8. The information processing device according to claim 1, wherein the dialogue target region determination unit is further configured to:
determine whether a moving body related to the moving body region is identical to the object related to the object region; and
specify the dialogue target region based on a result of the determination of whether the moving body is identical to the object.

9. The information processing device according to claim 8, wherein the dialogue target region determination unit is further configured to:
determine that the moving body is identical to the object based on the moving body region that partially overlaps the object region; and
specify the moving body region as the dialogue target region based on the determination that the moving body is identical to the object.

10. The information processing device according to claim 9, wherein, in a case where the moving body related to the moving body region is determined as the dialogue target in past, the dialogue target region determination unit is further configured to specify specifics the moving body region as the dialogue target region.

11. The information processing device according to claim 8, wherein, in case where the dialogue target region determination unit determines that the moving body is identical to the object, the dialogue target region determination unit is further configured to specify specifics the moving body region as the dialogue target in a case where the object is the dialogue target.

12. The information processing device according to claim 8, wherein, in a case where the dialogue target region determination unit determines that the moving body is identical to the object, the dialogue target region determination unit is further configured to specify the moving body region as the dialogue target based on the object that is a person.

13. The information processing device according to claim 1, wherein the dialogue target region determination unit is further configured to specify the dialogue target region based on an operation range of the moving body region.

14. The information processing device according to claim 13, wherein
the operation range exceeds a threshold, and
the dialogue target region determination unit is further configured to specify the moving body region as the dialogue target region based on the operation range that exceeds the threshold.

15. The information processing device according to claim 13, wherein, in a case where the operation range does not exceed a region corresponding to the object, the dialogue target region determination unit is further configured to determine that the moving body region is different from the dialogue target region.

16. The information processing device according to claim 1, wherein
the dialogue target region determination unit is further configured to exclude, from the dialogue target region, the moving body region corresponding to a following object, and
the following object follows the object determined as the dialogue target.

17. The information processing device according to claim 1, wherein the determination unit is further configured to reset a determination result related to the dialogue target based on a change in disposition of the information processing device.

18. An information processing method comprising:
receiving a plurality of images continuously in a temporally sequential manner;
detecting, based on an image of the plurality of images, an object region related to an object that outputs voice;
determining a moving body region based on the plurality of images continuously received in the temporally sequential manner;
determining whether the object that outputs the voice is a dialogue target related to voice dialogue, wherein the determination of the dialogue target is based on the image;
specifying a dialogue target region related to the dialogue target in the object region, wherein the dialogue target region is specified based on the moving body region, the object region, and the determination that the object is the dialogue target;
executing control related to the voice dialogue based on the dialogue target region and the determination of whether the object is the dialogue target; and
outputting a voice dialogue function to the object in a case where the object is determined as the dialogue target.

* * * * *